US008271973B2

(12) United States Patent
Barrett

(10) Patent No.: US 8,271,973 B2
(45) Date of Patent: Sep. 18, 2012

(54) AUTOMATED NOTIFICATION OF SOFTWARE INSTALLATION FAILURES

(75) Inventor: David Michael Barrett, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1178 days.

(21) Appl. No.: 11/223,094

(22) Filed: Sep. 9, 2005

(65) Prior Publication Data

US 2007/0061803 A1   Mar. 15, 2007

(51) Int. Cl.
G06F 9/445   (2006.01)
(52) U.S. Cl. ...................................... 717/176
(58) Field of Classification Search .................. 717/171, 717/176–178; 714/36; 709/203, 222; 358/1.15
See application file for complete search history.

(56) References Cited

U.S. PATENT DOCUMENTS

| | | | |
|---|---|---|---|
| 6,199,204 B1 * | 3/2001 | Donohue | 717/178 |
| 6,253,211 B1 * | 6/2001 | Gillies et al. | 707/201 |
| 7,600,226 B2 * | 10/2009 | Aiba et al. | 717/171 |
| 2002/0100036 A1 * | 7/2002 | Moshir et al. | 717/173 |
| 2003/0137689 A1 * | 7/2003 | Bontempi | 358/1.15 |
| 2003/0208685 A1 * | 11/2003 | Abdel-Rahman | 713/191 |
| 2004/0003266 A1 * | 1/2004 | Moshir et al. | 713/191 |
| 2004/0150851 A1 * | 8/2004 | Sato | 358/1.13 |
| 2004/0210653 A1 * | 10/2004 | Kanoor et al. | 709/223 |
| 2005/0021606 A1 * | 1/2005 | Davies et al. | 709/203 |
| 2005/0044156 A1 * | 2/2005 | Kaminski et al. | 709/206 |
| 2005/0097041 A1 * | 5/2005 | Campbell et al. | 705/40 |
| 2005/0198236 A1 * | 9/2005 | Byers et al. | 709/222 |
| 2005/0248805 A1 * | 11/2005 | Shima | 358/1.15 |
| 2006/0107119 A1 * | 5/2006 | Miller et al. | 714/36 |

OTHER PUBLICATIONS

Author: PatchLink Corp. Title: "PatchLink® Update™ 4.0 White Paper: Cross-platform Security Patch Management" Date: 2002 Pertinent pp. 3 URL: "http://www.contegosecurity.com/docs/PatchLink.pdf".*
Author: DuoData Software Title: "Automater Freeware—Send files via e-mail attachment automatically—DuoData" Date: Jun. 2004 URL: "http://www.duodata.de/automailer/".*
Author: Thoeny, Peter Title: "TWiki Site Tools < TWiki < Biowiki" Date: Aug. 28, 2004 URL: "http://biowiki.org/view/TWiki/TWikiSiteTools".*
Author: HP Forums Title: "IT Resource Center Forums—Email Text from Log File" Date: Aug. 15, 2006, referencing built-in functionality to 2003 operating system URL: "http://forums11.itrc.hp.com/service/forums/questionanswer.do?admit=109447626+1242138651227+28353475&threadId=1051536".*
Author: Wikipedia; Title: "Email client"; Date retrieved: Feb. 22, 2010; URL: http://en.wikipedia.org/wiki/Email_client.*
Author: Wikipedia; Title: "Domain Name System"; Date retrieved: Feb. 25, 2010; URL: http://en.wikipedia.org/wiki/Domain_Name_System.*
Author: Koch; Title: "Using Passwords in Outlook Express"; Date: Jan. 24, 2005; URL: http://www.microsoft.com/windows/IE/community/columns/passwords.mspx.*
Author: White; Title: "Network Install HOWTO—5. SuSE Client Install"; Date: Sep. 12, 2002; URL-TOC: http://tldp.org/HOWTO/Network-Install-HOWTO.html ; URL: http://tldp.org/HOWTO/Network-Install-HOWTO-5.html.*

(Continued)

Primary Examiner — Tuan Anh Vu
(74) Attorney, Agent, or Firm — Morrison & Foerster LLP

(57) ABSTRACT

A system and method are disclosed for enabling the system administrator to identify servers in which the installation of drivers failed without having to examine the installation log of each server by directing the server to send an e-mail to the system administrator in the event of an installation failure. The need for examination of installation logs is eliminated as e-mail messages provide proactive, immediate and specific failure notifications to the system administrator.

19 Claims, 2 Drawing Sheets

OTHER PUBLICATIONS

Author: Brown; Title: "YUM: Yellowdog Updater, Modified"; Date: Dec. 17, 2003; URL: http://www.phy.duke.edu/~rgb/General/yum_article/yum_article.pdf.*

AutoPilot Installer for Windows Server 2003 and Windows 2000 Server Quick Installation Manual, Emulex Corporation.

The Stratus ActiveService Architecture: Remote Access to Mission-Critical Support, 24/7, a white paper from Stratus Technologies, 2004 Stratus Technologies Bermuda Ltd.

* cited by examiner

AUTOMATED NOTIFICATION OF SOFTWARE INSTALLATION FAILURES

FIELD OF THE INVENTION

This invention relates to the automated installation of software in servers in a network, and more particularly, to automatically notifying system administrators of software installation failures upon completion of the automated software installation.

BACKGROUND OF THE INVENTION

When deploying new software such as drivers in networked servers, or when updating the software in the servers to upgrade the system or address a bug, the software may need to be installed in a large number of servers. This can be a cumbersome task, especially in Enterprise systems where hundreds or even thousands of servers may be involved. The task can be automated with scripting, but then the script itself needs to be written and debugged.

Due to configuration management issues, the installation or update will fail on some percentage of these servers. Currently, system administrators must examine the installation reports of each and every server to determine whether or not each installation was successful. This is a time consuming process, especially when large number of servers are being updated.

Therefore, there is a need to be able to verify the installation of software in a number of servers without having to examine the installation log of each server.

SUMMARY OF THE INVENTION

To install or update software such as drivers in networked servers, the software may need to be installed in a large number of servers. Automated installation programs are often executed in each server to perform these software installations. However, due to configuration management issues, the installation or update will fail on some percentage of these servers. Embodiments of the present invention are directed to enabling the system administrator to identify servers in which the installation of drivers failed without having to examine the installation log of each server by directing the server to send an e-mail to the system administrator in the event of an installation failure. The need for examination of installation logs is eliminated as e-mail messages provide proactive, immediate and specific failure notifications to the system administrator.

To perform an automated software installation in a number of servers, a system administrator at the administrator workstation may send a command out over the Ethernet LAN to each of the servers, directing the OS of each server to download an installation program and a configuration file. The configuration file provides the identity and location of the driver to download from the central server. After the proper driver is identified and located, it is downloaded over the Ethernet LAN to each server. Utilities bundled with the driver may then be installed by the installation program and used along with information in the configuration file to initially install and configure the drivers.

In embodiments of the present invention the configuration file downloaded by each server also contains an e-mail report, which includes the network name of the e-mail server, an e-mail account login username, the name and location of an encrypted file containing an e-mail password, and a destination e-mail address (e.g. of the system administrator) to which to send failure notifications. For installation programs that do not utilize configuration files, the contents of the e-mail report are provided by other means, such as in other files or bundled with the installation program itself.

When the installation program encounters an error, it is recorded in an installation report, which includes the server name, the time and date, configuration information from the downloaded configuration file that identifies the configuration file, and a sequence of driver installation steps and the outcome of each step (e.g., where it looked for drivers, what drivers it found), what drivers are currently installed in the HBA in that server, and a detailed description of the error. Then, using the information in the e-mail report, a copy of the installation report is mailed to the provided e-mail address over the Ethernet LAN.

To e-mail the installation report, the username and password are used to login to the e-mail server identified by its network name, and an e-mail message is composed and sent to the destination e-mail address. In embodiments of the present invention, the e-mail is sent from each server using the IMessage service that is part of the Collaboration Data Objects (CDO) built into Windows 2000 and later Windows platforms, although the invention could also be made to work on any operating system that provides e-mail support.

For security purposes the e-mail password is not communicated in a plain text file via the configuration file, but rather the configuration file contains the name and location of an encrypted file that contains the password. A small program is provided along with the installation program that encrypts the password and produces the encrypted file that is referenced by the configuration file. The installation program also contains a decryption program so that when the encrypted file is received by the installation program, either in the configuration file or by some other means, the installation program is able to decrypt the encrypted file to obtain the password.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

It is to be further understood that although the installation or updating of drivers for Host Bus Adapters (HBAs) is described herein for purposes of illustration only, embodiments of the present invention are generally applicable to the installation or updating of other types of software or firmware within servers.

Because it is not practical nor efficient to perform driver installation manually for each server, a system administrator will typically use an unattended or automated installation program such as Emulex Corporation's AUTOPILOT INSTALLER™(see EMULEX® AutoPilot Installer Quick Installation Manual, Copyright© 2005 Emulex Corporation, incorporated herein by reference) to install the drivers. Note that although AUTOPILOT INSTALLER™ is described herein for purposes of illustration, other commercially available software installation packages (e.g. InstallShield Software Corporation's INSTALLSHIELD®, Zero G Software's InstallAnywhere, and the like) may also be used.

Figure 1:
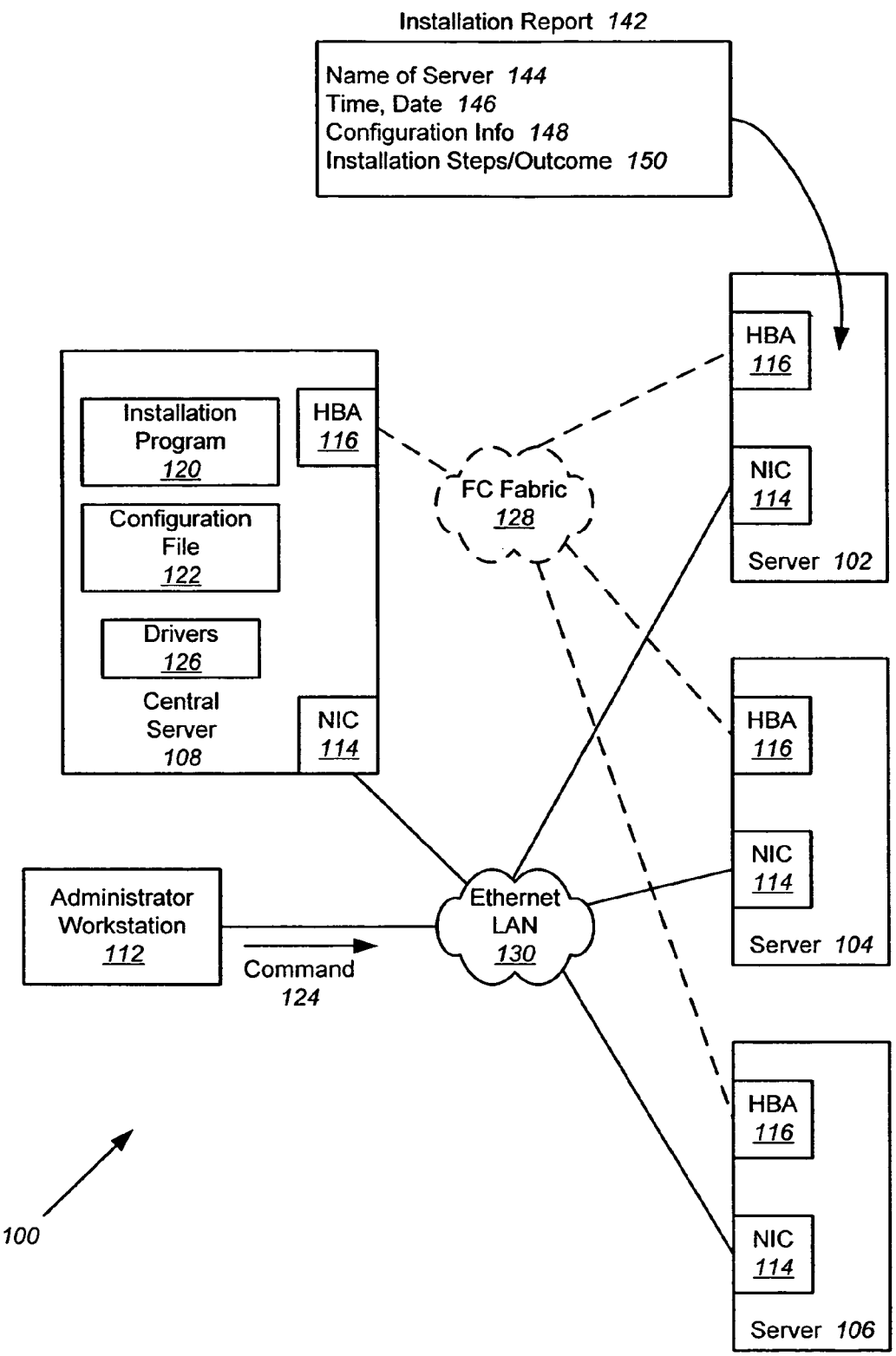
FIG. 1 is an exemplary block diagram of an exemplary Storage Area Network (SAN) containing multiple servers, a central server and a system administrator workstation, all connected via an Ethernet Local Area Network (LAN), within which software updates to multiple servers must be performed.

FIG. 1 is an illustration of an exemplary Storage Area Network (SAN) 100 containing multiple servers 102, 104 and 106, a central server 108 and a system administrator workstation 112, all connected via an Ethernet Local Area Network (LAN) 130. Each server 102, 104 and 106 and the central server 108 includes a Network Interface Card (NIC) 114 for enabling the server to communicate using the Internet Protocol (IP) over the Ethernet LAN 130. Each server 102, 104 and 106 and the central server 108 also includes an HBA 116 for enabling the server to communicate using the Fibre Channel (FC) protocol over a FC Fabric 128. The central server 108 acts as a centralized repository and may include an installation program such as AUTOPILOT INSTALLERV™ 120, an AutoPilot configuration file 122, an encrypted password file, and one or more drivers 126. The configuration file 122 is a text file provided with AUTOPILOT INSTALLER™ 120, customizable by the system administrator or the like, that contains driver configuration information and other information that indicates to the AUTOPILOT INSTALLER™ 120 where resources such as drivers, driver parameters and utilities are located for the servers into which drivers are being installed. Using a single configuration file for all drivers ensures that all drivers will be configured the same. Note that other installation programs may not employ separate configuration files and drivers, but rather may include configuration information and the drivers within the installation program.

Prior to the discovery of HBAs 116 connected to the network 100, communications over the FC fabric 128 are not possible. Therefore, a system administrator at the administrator workstation 112 may cause each server to locally invoke an unattended or automated installation program such as AUTOPILOT INSTALLER™ 120 over the Ethernet LAN 130 to install the drivers. Using the administrator workstation 112, a command 124 is sent out over the Ethernet LAN 130. Note that the command 124 may be a Disk Operating System (DOS) command (e.g. \\serverID\apinstall\apconfig01) typed into a DOS command line at a DOS command prompt. To direct the command 124 to the servers, a well-known program such as Terminal Services may be used, which allows a system administrator to establish a connection with one or more servers through the Ethernet LAN 130, and enables the system administrator to effectively act as though he/she was sitting at a terminal connected to each of the servers. The system administrator may create a batch file containing the command 124, and then use Terminal Services to effectively run the batch file on each server. The system administrator could even create a master batch file to establish the connections with each of the servers using Terminal Services.

This command 124 is received by each of the servers 102, 104 and 106, and directs the Operating System (OS) of each server to issue commands to the NIC 114 to access the central server 108 (e.g. "serverID") over the Ethernet LAN 130 and download AUTOPILOT INSTALLER™ 120 (e.g. "apinstall"). After AUTOPILOT INSTALLER™ 120 has been downloaded into the servers, it is executed locally in each server. The command prompt 124 also includes an argument (e.g. "apconfig01") which provides AUTOPILOT INSTALLER™ 120 with the location in the central server 108 from which to download the AutoPilot configuration file 122, although in alternative embodiments the configuration file could be stored in a location other than the central server. After the AutoPilot configuration file 122 has been downloaded into the servers, it is read to determine the identity and location of the driver to download from the central server 108, although in alternative embodiments the driver could be stored in a location other than the central server, or be part of the installation program. After the proper driver is identified and located, it is downloaded (if necessary) over the Ethernet LAN 130 to each server. Utilities bundled with the driver may then be installed by AUTOPILOT INSTALLER™ 120 and used along with information in the configuration file to initially install and configure the drivers. Note that if the new driver version is the same as the existing driver version, the new driver may not be installed. After the driver is installed, AUTOPILOT INSTALLER™ 120 is deleted from the server's memory. Note that AUTOPILOT INSTALLER™ 120 runs "silently"—in other words, the system administrator need only enter a command, and need not repeatedly type in information to a user interface to install drivers in the servers.

At some later point in time, if the drivers need to be updated or replaced with a newer version, a system administrator may use the Ethernet LAN 130 to send a command to start the update process, and use the FC fabric 128 to retrieve files from the central server and perform these updates. It is generally safer to update the drivers in the HBAs of the servers using out-of-band communications (e.g. the Ethernet LAN 130) to maintain recovery capabilities in case something should fail during installation. For example, if the FC fabric is being used and a driver installation fails, communications may no longer be available over the FC fabric. If the Ethernet LAN 130 is used, the system administrator at the administrator workstation 112 may cause each server to locally invoke an unattended or automated installation program such as AUTOPILOT INSTALLER™ 120 over the Ethernet LAN 130 to download AUTOPILOT INSTALLER™, download the configuration file, download the new driver, and install the new driver, as described in greater detail above.

Despite the danger of attempting driver updates using in-band communications, the FC fabric may nevertheless be utilized to perform driver updates. The initial command 124 from the system administrator workstation 112 would still be sent to the servers over the Ethernet LAN 130. The subsequent communications between the servers and the central server 108 to download AUTOPILOT INSTALLER™ 120, the configuration file 122, and the appropriate driver would be through the HBAs 116 over the FC fabric 128. The only other difference is related to the fact that in many cases before Windows can start using a new driver, it must turn off the old driver and then start the new driver. If there are files open in the file system, the old drivers cannot simply be turned off. In such a case, the configuration file 122 can instruct AUTOPILOT INSTALLER™ 120 to either re-boot the system in order to use the new drivers, or not to re-boot the system. Because AUTOPILOT INSTALLER™ 120 cannot determine if it is safe to re-boot the system, that decision is left with the system administrator. It may also be possible through Windows to simply stop the old driver from running, update it with the new driver, and seamlessly resume operation with the new driver.

Due to configuration management issues, the installation or update will fail on some percentage of these servers. When the installation program 120 encounters an error, it is recorded in an installation report 142, which includes the server name 144, the time and date 146, configuration information 148 from the downloaded configuration file that identifies the configuration file, and a sequence of driver installation steps and the outcome of each step 150 (e.g., where it looked for drivers, what drivers it found), what drivers are currently installed in the HBA in that server and a detailed description of the error. For example, if the located driver to be installed was an older version that what is currently installed, the update would not occur, and the installation report 142 would indicate that the older driver was found and that the newer driver is currently installed in the HBA. The location at which the installation report is to be stored and the name of installation report may be provided in the configuration file. If no location or name is specified, a default name will be used to store the installation report in local permanent storage (disk drive) in the server. In the case of duplication file names, the installation program may append a number to the installation report name and try to store the report again.

Embodiments of the present invention further enable the system administrator to identify servers in which the installation of drivers failed without having to examine the installation log of each server. Embodiments of the present invention eliminate the need for examination of the installation logs by directing the server to send an e-mail to the system administrator in the event of an installation failure. The need for examination of installation logs is eliminated as e-mail messages provide proactive, immediate and specific failure notifications to the system administrator.

Figure 2:
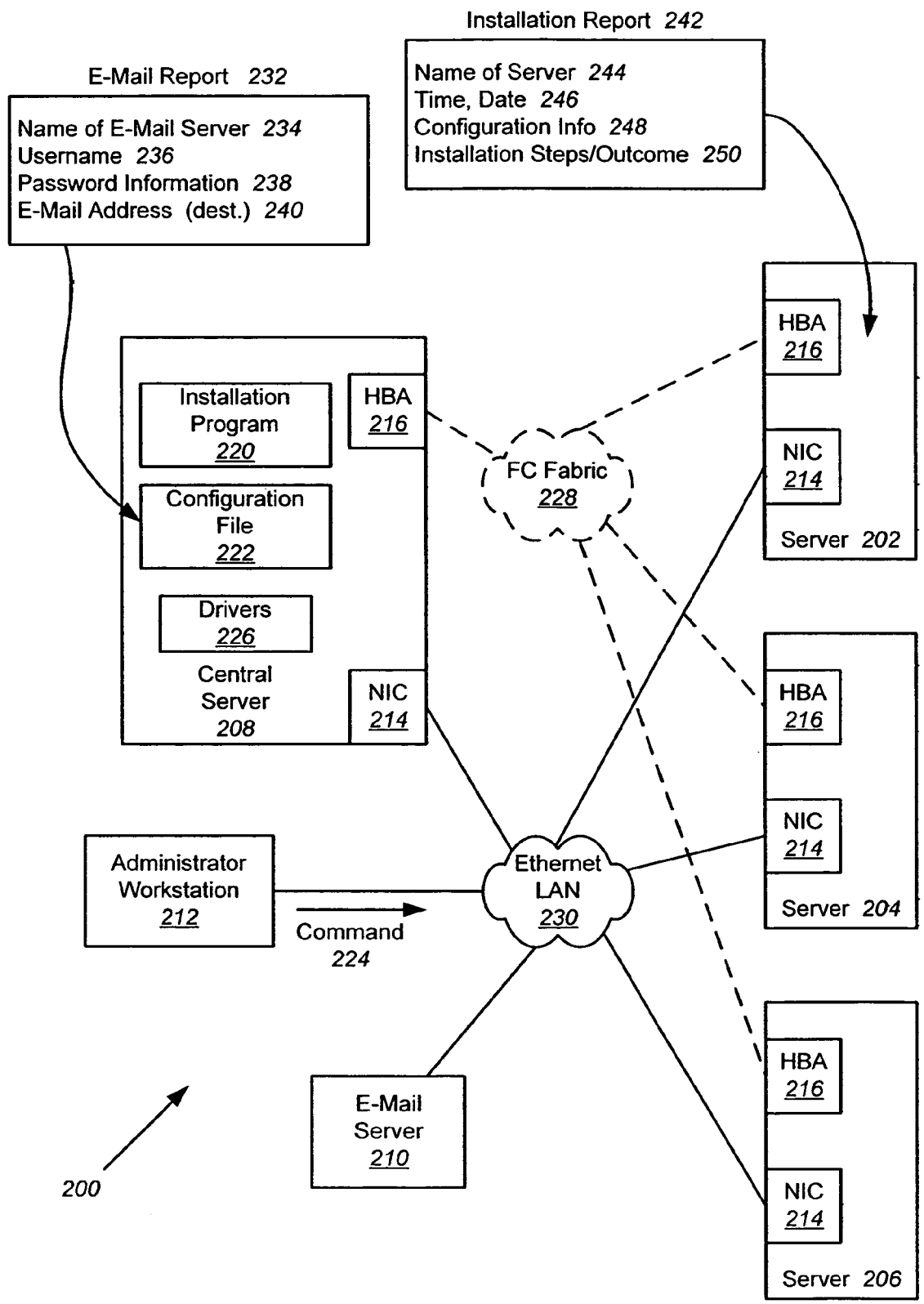
FIG. 2 is an illustration of an exemplary SAN containing multiple servers, a central server, a mail server, and a system administrator workstation, all connected via an Ethernet LAN for notifying system administrations about installation failures according to embodiments of the present invention.

FIG. 2 is an illustration of an exemplary Storage Area Network (SAN) 200 containing multiple servers 202, 204 and 206, a central server 208, a mail server 210, and a system administrator workstation 212, all connected via an Ethernet Local Area Network (LAN) 230 carrying the Internet Protocol (IP) according to embodiments of the present invention. Each server 202, 204 and 206 and the central server 208 includes a Host Bus Adapter (HBA) 216 for enabling the server to communicate over a network 228 (e.g. a FC Fabric). The central server 208 may include AUTOPILOT INSTALLER™ 220, one or more AutoPilot configuration files 222, and one or more drivers 226. Drivers for the HBAs 216 may be installed either prior to or after initialization of the network 200, as described below.

The installation of driver software has been discussed above, and will only be summarized here. As described above, a system administrator at the administrator workstation 212 may send a command 224 out over the Ethernet LAN 230 to each of the servers 202, 204 and 206, directing the OS of each server to download AUTOPILOT INSTALLER™ 220 and the AutoPilot configuration file 222. The AutoPilot configuration file 222 provides the identity and location of the driver to download from the central server 208.

At this stage, if the drivers need to be updated or replaced with a newer version, a system administrator may use the Ethernet LAN 130 and the FC fabric 128 to perform these updates, as described above.

In embodiments of the present invention the configuration file 222 downloaded by each server contains an e-mail report 232, which includes the network name 234 of the e-mail server, an e-mail account login username 236 and the location of an encrypted password file 238, and a destination e-mail address 240 (e.g. of the system administrator) to which to send failure notifications. For installation programs that do not utilize configuration files, the contents of the e-mail report 232 are provided by other means, such as in other files or bundled with the installation program itself.

When the installation program 220 encounters an error, it is recorded in an installation report 242, which includes the server name 244, the time and date 246, configuration information 248 from the downloaded configuration file that identifies the configuration file, and a sequence of driver installation steps and the outcome of each step 250 (e.g., where it looked for drivers, what drivers it found), and what drivers are currently installed in the HBA in that server. For example, if the located driver to be installed was an older version that what is currently installed, the update would not occur, and the installation report 242 would indicate that the older driver was found and that the newer driver is currently installed in the HBA. Then, using the information in the e-mail report 232, a copy of the installation report 242 is mailed to the provided e-mail address 240 over the Ethernet LAN 230.

To e-mail the installation report 242, the username 236 and password obtained from the encrypted password file are used to login to the e-mail server 210 identified by its network name 234, and an e-mail message is composed and sent to the destination e-mail address 240. In embodiments of the present invention, the e-mail is sent from each server using the IMessage service that is part of the Collaboration Data Objects (CDO) built into Windows 2000 and later Windows platforms, although the invention could also be made to work on any operating system that provides e-mail support. For security purposes the password is not communicated in a plain text file via e-mail, but rather an encrypted file is provided that contains the password. A small program is provided along with the installation program that encrypts the password and produces the encrypted file that is included in the e-mail message. The installation program contains a decryption algorithm so that when the encrypted file is received it is able to decrypt the encrypted file to obtain the password.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system capable of executing an automated installation program in a plurality of servers to install a driver of Host Bus Adapters (HBA) in the plurality of servers, a method for receiving feedbacks of the installation comprising:

providing, over a network to the servers, to each of the plurality of servers a configuration file including an identity and location of the driver to be installed, driver configuration information, and an e-mail report containing information for generating an e-mail message if a driver installation failure should occur in one or more of the servers; and if a driver installation failure should occur in a particular server, recording error information including configuration information from the configuration file, a server name, a sequence of driver installation steps, and an outcome of each step in an installation report in that server, and utilizing the e-mail report to send an e-mail message containing the installation report.

2. The method as recited in claim 1, the e-mail report comprising a network name of an e-mail server, an e-mail account login username, an encrypted password file, and a destination e-mail address to which to send e-mail messages.

3. The method as recited in claim 2, further comprising:

logging into the e-mail server identified by the network name using the username and encrypted password file; and composing and sending an e-mail message to the destination e-mail address including the error information.

4. The method as recited in claim 3, wherein the encrypted password file includes a password.

5. The method as recited in claim 4, further comprising encrypting the password using an encryption program provided along with the installation program.

6. The method as recited in claim 1, further comprising:
sending a command to each of the plurality of servers to download the automated installation program from a particular location specified in the command; and
within each server, downloading and executing the automated installation program, reading configuration information to determine an identity and location of the driver to be installed, and installing and configuring the driver.

7. The method as recited in claim 6, further comprising: within each server, downloading the configuration file during the execution of the automated installation program from a particular location specified in the command.

8. The method as recited in claim 7, further comprising: within each server, downloading the driver during the execution of the automated installation program from a particular location specified in the configuration file.

9. The method as recited in claim 1, wherein the network is an Ethernet LAN.

10. The method as recited in claim 1, wherein the e-mail report is part of the automated installation program.

11. One or more storage media including an automated installation program which, when executed by one or more processors in each of a plurality of servers, automatically installs a driver of a Host Bus Adapter (HBA) in each of the plurality of servers and identifies the server if the installation of driver failed by causing the one or more processors to perform the steps of:
reading configuration information to determine an identity and location of the driver to be installed, the configuration information including driver configuration information and an e-mail report containing information for generating an e-mail message if a driver installation failure should occur in one or more of the servers;
installing and configuring the driver; and
if a driver installation failure should occur in the server, recording error information including configuration information from the configuration file, a server name, a sequence of driver installation steps, and an outcome of each step in an installation report in that server, and utilizing the e-mail report to send an e-mail message containing the installation report, wherein the configuration information including the email report containing information for generating the email message is received over a network by each of the plurality of servers.

12. The one or more storage media as recited in claim 11, the e-mail report including a network name of an e-mail server, an e-mail account login username, an encrypted password file, and a destination e-mail address to which to send e-mail messages.

13. The one or more storage media as recited in claim 12, wherein the automated installation program, when executed by the one or more processors in each of the plurality of servers, further causes the one or more processors to perform the steps of:
logging into the e-mail server identified by the network name using the username and encrypted password file; and
composing and sending an e-mail message to the destination e-mail address including the error information.

14. The one or more storage media as recited in claim 12, wherein the automated installation program, when executed by the one or more processors in each of the plurality of servers, further causes the one or more processors to perform the step of communicating the password to the automated installation program in an encrypted file.

15. The one or more storage media as recited in claim 14, wherein the automated installation program, when executed by the one or more processors in each of the plurality of servers, further causes the one or more processors to perform the step of encrypting the password using an encryption program provided along with the installation program.

16. The one or more storage media as recited in claim 11, wherein the automated installation program, when executed by the one or more processors in each of the plurality of servers, further causes the one or more processors to perform the step of:
downloading a configuration file from a particular location.

17. The one or more storage media as recited in claim 16, wherein the automated installation program, when executed by the one or more processors in each of the plurality of servers, further causes the one or more processors to perform the step of:
downloading the software from a particular location specified in the configuration file.

18. The one or more storage media as recited in claim 16, wherein the e-mail report is part of the automated installation program.

19. The one or more storage media as recited in claim 11, wherein the network is an Ethernet LAN.

\* \* \* \* \*